(12) United States Patent
Shim et al.

(10) Patent No.: US 11,909,845 B2
(45) Date of Patent: *Feb. 20, 2024

(54) METHODS AND SYSTEMS FOR MANAGING APPLICATIONS OF A MULTI-ACCESS EDGE COMPUTING ENVIRONMENT

(71) Applicant: Verizon Patent and Licensing Inc., Basking Ridge, NJ (US)

(72) Inventors: Cheul Shim, River Vale, NJ (US); Mahadevan Viswanathan, Summit, NJ (US); Thierry R. Sender, New York, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 70 days.

This patent is subject to a terminal disclaimer.

(21) Appl. No.: 17/652,294

(22) Filed: Feb. 24, 2022

(65) Prior Publication Data
US 2022/0182456 A1 Jun. 9, 2022

Related U.S. Application Data

(63) Continuation of application No. 16/270,120, filed on Feb. 7, 2019, now Pat. No. 11,290,561.

(51) Int. Cl.
*H04L 67/59* (2022.01)
*H04L 41/0806* (2022.01)
*H04L 9/40* (2022.01)
*G06F 8/61* (2018.01)
*H04L 69/08* (2022.01)

(52) U.S. Cl.
CPC .......... *H04L 67/59* (2022.05); *H04L 41/0806* (2013.01); *H04L 63/0876* (2013.01); *G06F 8/61* (2013.01); *H04L 69/08* (2013.01)

(58) Field of Classification Search
None
See application file for complete search history.

(56) References Cited

U.S. PATENT DOCUMENTS

| | | | |
|---|---|---|---|
| 8,281,377 B1 * | 10/2012 | Snow | H04L 65/61 726/11 |
| 9,253,158 B2 * | 2/2016 | Ringdahl | H04L 63/0254 |
| 9,942,825 B1 | 4/2018 | Narayanan | |
| 10,237,235 B1 | 3/2019 | Dickinson | |
| 11,558,313 B2 * | 1/2023 | Caceres | H04W 76/10 |
| 11,570,277 B2 * | 1/2023 | Xia | H04L 61/50 |

(Continued)

*Primary Examiner* — Quang N Nguyen

(57) ABSTRACT

Examples herein involve a multi-access edge computing (MEC) environment. An example process may include receiving a tenant application that is to be hosted in a MEC environment. The MEC environment may be situated between a user device and an external platform. The process may include assigning an edge service identifier (ESID) to the tenant application. The ESID may be used to indicate that a message, associated with the user device, involves the tenant application. The process may include assigning a host identifier to the tenant application. The host identifier may be used to indicate that report data, associated with execution of the tenant application within the MEC environment, is to be provided to the external platform. The process may include routing communications associated with the tenant application using the ESID and the host identifier.

20 Claims, 8 Drawing Sheets

(56) References Cited

U.S. PATENT DOCUMENTS

| | | | |
|---|---|---|---|
| 11,611,486 B2* | 3/2023 | Venkata | H04L 67/60 |
| 11,675,576 B2* | 6/2023 | Ramaswamy | H04L 41/0896 |
| | | | 717/176 |
| 11,689,640 B2* | 6/2023 | Roth | H04L 67/10 |
| | | | 709/203 |
| 2012/0047239 A1 | 2/2012 | Donahue et al. | |
| 2012/0266302 A1* | 10/2012 | Bergemann | A23D 9/00 |
| | | | 800/301 |
| 2015/0058967 A1* | 2/2015 | Ringdahl | H04L 63/0254 |
| | | | 726/11 |
| 2015/0358263 A1 | 12/2015 | Bertin et al. | |
| 2016/0043968 A1 | 2/2016 | Jacob et al. | |
| 2017/0034643 A1 | 2/2017 | Young et al. | |
| 2017/0251368 A1 | 8/2017 | Ross et al. | |
| 2018/0351824 A1 | 12/2018 | Giust et al. | |
| 2018/0352594 A1* | 12/2018 | Iwai | H04L 47/825 |
| 2019/0104030 A1* | 4/2019 | Giust | H04L 41/0893 |
| 2020/0028938 A1* | 1/2020 | Rasanen | H04L 45/38 |
| 2020/0099742 A1 | 3/2020 | Puente et al. | |
| 2020/0117513 A1 | 4/2020 | Li et al. | |
| 2020/0120665 A1 | 4/2020 | Jin et al. | |
| 2021/0105274 A1 | 4/2021 | Bender et al. | |

* cited by examiner

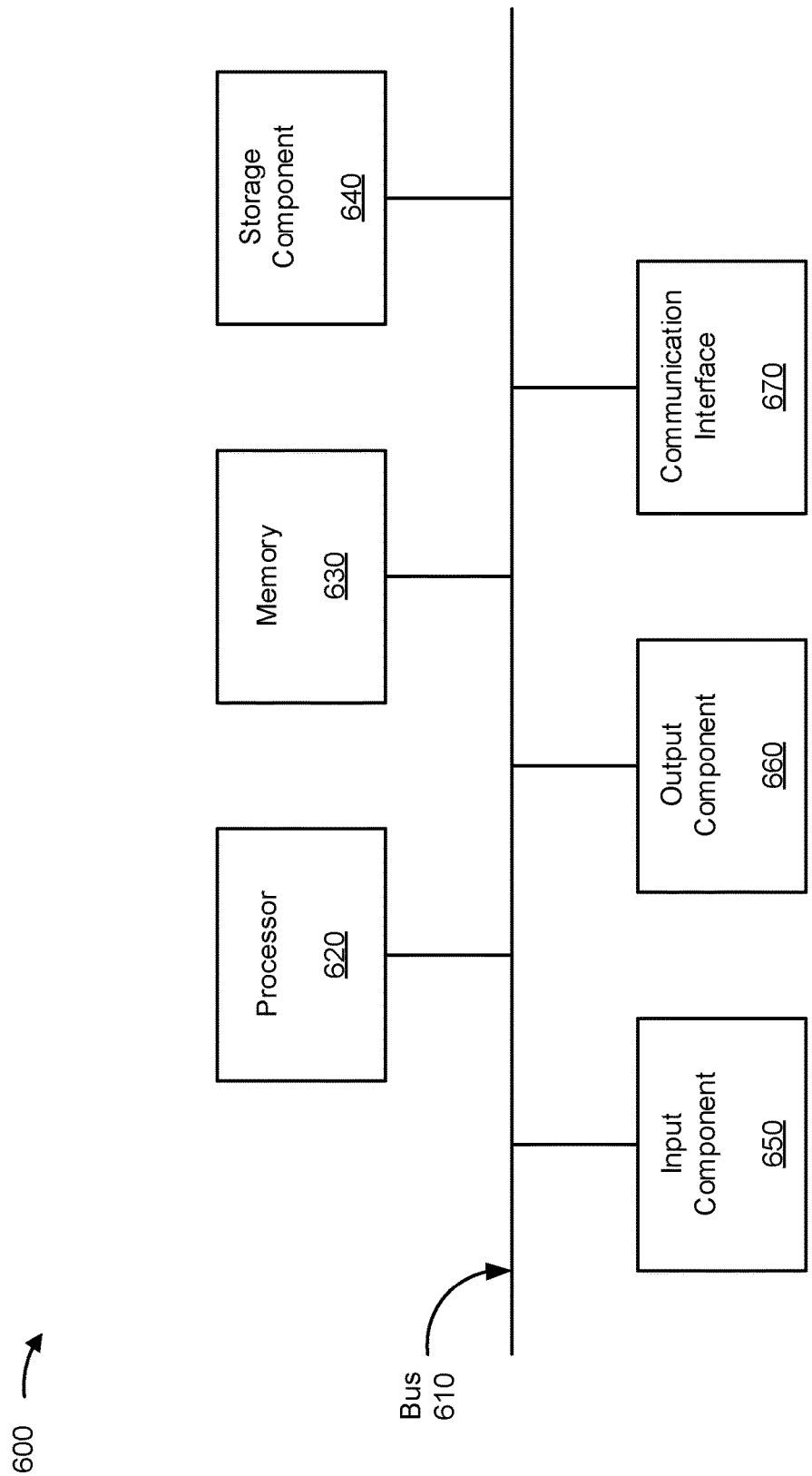

METHODS AND SYSTEMS FOR MANAGING APPLICATIONS OF A MULTI-ACCESS EDGE COMPUTING ENVIRONMENT

RELATED APPLICATION

This application is a continuation of U.S. patent application Ser. No. 16/270,120, entitled "METHODS AND SYSTEMS FOR MANAGING APPLICATIONS OF A MULTI-ACCESS EDGE COMPUTING ENVIRONMENT," filed Feb. 7, 2019, which is incorporated herein by reference in its entirety.

BACKGROUND

In a multi-access edge computing (MEC) environment, computing is enabled by a network architecture that provides computing capabilities, to a user device, via computing platforms at or near an edge of a network (e.g., a wireless communication network, such as a cellular network). Because a MEC environment can provide computing at or near the edge of the network, increased performance may be achieved over network architectures that provide computing from the core of the network, which may be located topologically and/or physically further from the user device than a MEC environment. Such increased performance may be achieved in the MEC environment, over other network architectures, due to less traffic and/or congestion between a user device and the computing platform, less latency (due to the closer proximity), increased flexibility (due to a greater amount of computing platforms), and/or the like.

BRIEF DESCRIPTION OF THE DRAWINGS

FIG. 6 is a diagram of example components of one or more devices of FIGS. 5A and 5B.

DETAILED DESCRIPTION OF PREFERRED EMBODIMENTS

Figure 1:
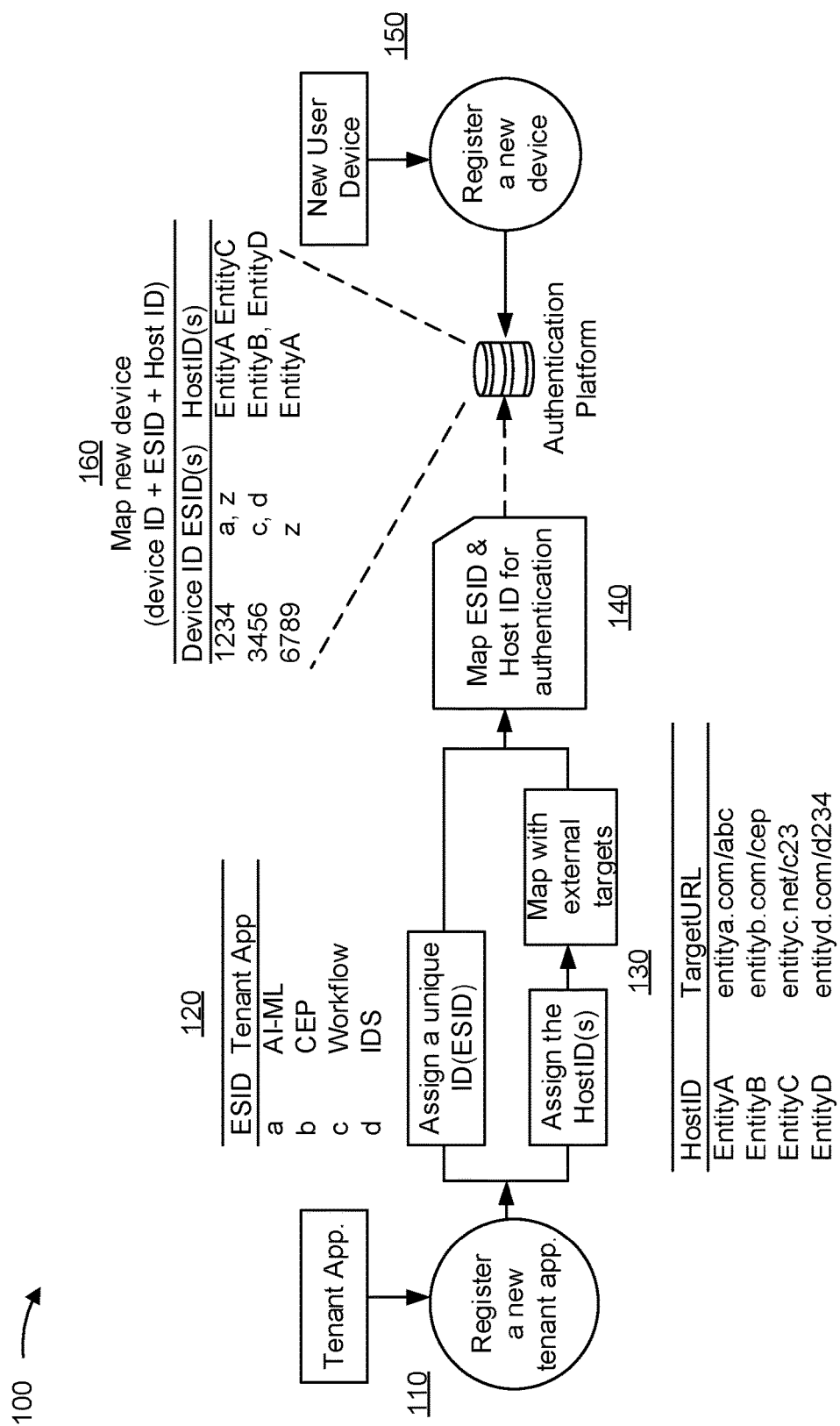
FIGS. 1-4 are diagrams of one or more example implementations described herein.

The following detailed description of example implementations refers to the accompanying drawings. The same reference numbers in different drawings may identify the same or similar elements.

In some instances, an application may utilize both resources of a user device and resources of a multi-access edge computing (MEC) environment (e.g., resources of a MEC server, resources of a server device in the cloud environment, etc.) while the application is running. Examples of such an application may include augmented reality applications, virtual reality applications, image processing applications (e.g., which include mapping, security, and/or the like), autonomous vehicle control applications (e.g., which include high definition (HD) mapping, safety infrastructure, and/or the like), and/or the like. In some cases, most or all processing of the application may be offloaded to the MEC environment because the UE may not have the computing resources (e.g., processing power and/or memory resources) to perform the processing and the UE may simply display information provided from the MEC environment. Additionally, or alternatively, the application may be configured to process data from one or more user devices (e.g., Internet of Things (IoT) devices, and/or the like) and provide information (e.g., reports, logs, notifications, and/or the like) to an external platform (e.g., any device, network, and/or platform that is external relative to the MEC environment) configured to monitor the user devices via the application.

More and more applications are being uploaded and hosted within MEC environments. Receiving, installing, and deploying the applications to make the applications accessible via the MEC environment (which may be referred to as "onboarding") can involve a plurality of computing devices and/or platforms interacting with one another to allow user devices and/or external platforms to access the application. For example, a new application may be received from a developer, validated by one or more platforms, authenticated via an authentication platform, installed and/or managed via a management platform, verified in association with an external platform, and/or the like. Furthermore, a plurality of different processes, protocols, and/or communications between devices and/or platforms associated with the application may be utilized to onboard the applications to the MEC environment, thus requiring a relatively complex onboarding process to be individually performed for each new application that is to be onboarded to the MEC environment. Furthermore, similar complex processes may need to be performed to permit each new user device to access and/or communicate with the new applications. Accordingly, such processes may consume and waste a relatively large amount of computing resources (of all platforms involved) and/or network resources (consumed by the multiple and/or redundant exchanges of information across all platforms) when onboarding new applications to the MEC environment.

Some implementations described herein provide a MEC middleware platform that is configured to provide a uniform process for onboarding newly received applications (referred to herein as "tenant applications") for onboarding within a MEC environment, regardless of a type of application, external platform associated with the application, user devices associated with the application, and so on. For example, the MEC middleware platform may be configured to receive a new tenant application, automatically configure routing and/or mediation for the new tenant application (e.g., by assigning an edge service identifier (ESID), a host identifier associated with an external platform associated with the new tenant application, and/or the like), and enable a communication session involving the new tenant application to be established. Such a communication session may automatically permit a user device and/or an external platform to access (e.g., utilize, communicate with, provide data for processing, and/or the like) the tenant application to receive application data associated with executing the tenant application within the MEC environment. As described herein, the MEC middleware platform may utilize one or more mappings of user devices to one or more identifiers of the tenant application for the routing and/or mediation, to permit user devices and/or external platforms to access the tenant application.

Accordingly, as described herein, the MEC middleware platform may provide a centralized platform that eliminates the need for multiple, redundant communications between multiple separate computing devices and/or platforms to onboard new applications to a MEC environment. For example, assignment of an ESID and/or a host identifier can be automatically performed to eliminate the need for one or more platforms to manage and/or perform routing and/or mediation for new tenant applications, as described herein. Furthermore, the MEC environment can be configured to perform any necessary protocol conversion of communications between a user device, the MEC environment, and/or an external platform, to reduce the complexity of accessing the tenant applications and/or communicating with various types of user devices and/or external platforms. Therefore, the MEC middleware platform, as described herein, provides a simplified process for onboarding applications in a MEC environment and reduces the amount of computing resources and/or network resources consumed to onboard new tenant applications, relative to previous techniques.

FIG. 1 is a diagram of an example implementation 100 described herein. Example implementation 100 illustrates an example of onboarding a new tenant application to a MEC environment and/or a new device that is to use the new tenant application. The example processes described in connection with example implementation 100 may be performed by a MEC middleware platform of the MEC environment. The new tenant applications may be onboarded within the MEC environment and referred to as "tenant applications," once onboarded.

As shown in FIG. 1, and by reference number 110, a new tenant application is received that is to be registered as a tenant application of the MEC environment. For example, the new tenant application may be received (e.g., from a user device of an application developer) within an upload, a message, and/or the like to the MEC environment. The new tenant application may have been developed by an application developer and/or a development platform associated with an entity (e.g., an organization, an individual, and/or the like) that provides a service via the new tenant application.

The example new tenant application may be associated with performing one or more operations for a user device and/or in association with the user device. For example, as described herein, the new tenant application may be configured to receive input data from a user device, process the input data, generate output data, and provide the output data to the user device and/or an external platform associated with the new tenant application. As described herein, output data provided to the user device may permit the user device to interpret the output data and perform one or more operations according to the output data (e.g., display the output data, process the output data, and/or the like). Furthermore, output data provided to the external platform may include information associated with the user device and/or the new tenant application, such as a report, a log, a notification, and/or the like that indicates, to the external platform, a status of the new application and/or the user device.

As a specific example, if the new tenant application is associated with an intrusion detection system (IDS), the new tenant application, when executed, may receive input data (e.g., sensor data) from a plurality of IoT devices (e.g., glass break sensors, motion sensors, proximity sensors, and/or the like) and/or a user device (e.g., a control console of the IDS), interpret the information from the IoT devices to determine whether an intruder has been detected within a building, and provide output data (e.g., a report of when the IoT devices detected any activity based on the input data, a notification that an intruder has been detected based on the input data, and/or the like) to the user device and/or the external platform to permit the user device to perform an action (e.g., sound an alarm) and/or the external platform to perform an action (e.g., notify a user and/or law enforcement of an intrusion). Although one or more examples described herein may refer to a tenant application being an IDS application, any suitable type of application may be onboarded according to the processes and/or techniques described herein.

In this way, the MEC middleware platform may receive a new tenant application that is to be onboarded into the MEC environment to permit the MEC middleware platform to register one or more devices with the new tenant application.

As further shown in FIG. 1, and by reference number 120, the MEC middleware platform may assign an edge service identifier (ESID) to the new tenant application. For example, as shown, the MEC middleware platform may assign ESID "d" to the new tenant application with a descriptor of the new tenant application (e.g., an identifier, a name, and/or the like). The ESID may be unique relative to the MEC environment and/or a plurality of tenant applications of the MEC environment. Referring to the example mapping of example implementation 100, assuming that the MEC environment included three tenant applications identified by ESIDs a, b, c, the MEC middleware platform may assign ESID d (which is unique relative to a, b, c) to the newly received tenant application that is associated with the IDS. In some implementations, one or more user devices may be mapped to one or more ESIDs (e.g., if the one or more user devices are associated with a plurality of tenant applications).

In this way, the MEC middleware platform may assign a new, unique ESID to the new tenant application to permit the new tenant application to be identified by user devices when accessing the new tenant application (e.g., via a communication session and/or one or more messages—associated with a communication session).

As further shown in FIG. 1, and by reference number 130, the MEC middleware platform may assign a host identifier to the new tenant application. In some implementations, the host identifier is associated with a uniform resource locator (URL) associated with an external platform (e.g., an external platform controlled by the entity). For example, the host identifier may be mapped to a URL of the external platform. Additionally, or alternatively, the host identifier may include the URL of the external platform. In some implementations, the host identifier may be a unique identifier that is associated with an entity that provides a service via the new tenant application.

In some implementations, the MEC middleware platform may identify and/or determine the host identifier based on one or more characteristics of the new tenant application (e.g., based on a source of the new tenant application, based on a target of the new tenant application (e.g., a target URL included in code of the new tenant application), based on an application type of the new tenant application, based on a service provided the new application, and/or the like). Accordingly, the MEC middleware platform may perform an analysis of the new tenant application to identify and/or assign the host identifier. The host identifier may be assigned by including the host identifier in a mapping of the new tenant application to the ESID and/or a mapping of user devices to the new tenant application.

In some implementations, the MEC middleware platform may be preconfigured with a mapping of host identifiers (e.g., which correspond to entities that are registered to use the MEC environment). For example, the MEC middleware platform may be controlled by a service provider that permits entities to host corresponding applications that provide corresponding services. Accordingly, the mapping of host identifiers may include a list of host identifiers that correspond to entities that receive a service (e.g., involving hosting tenant applications) from the service provider. For example, the entities may use the MEC environment to host tenant applications to provide services corresponding via the tenant applications. In such cases, when a new tenant application is received the new tenant application can be assigned a host identifier that corresponds to an entity that provided the new tenant application and/or is associated with the new tenant application. In some implementations, one or more user devices may be mapped to one or more host identifiers (e.g., if the one or more user devices are associated with a plurality of tenant applications).

Referring to the example above, the MEC middleware platform may host one or more tenant applications for an entity associated with the IDS. Additionally, or alternatively, the entity may have registered with the MEC middleware platform as a customer (e.g., prior to sending the tenant application for onboarding) and host identifier EntityD may have been created for the entity. Accordingly, the MEC middleware platform may assign host identifier EntityD to the new tenant application. The host identifier EntityD may represent the entity that controls the IDS and/or provides a security service via the IDS.

In this way, the MEC middleware platform may assign a host identifier to a new tenant application by including the host identifier and/or new tenant application (e.g., as identified by the ESID) in a mapping. Accordingly, the ESID and/or host identifier can be used for routing and/or mediation of traffic associated with the new tenant application.

As further shown in FIG. 1, and by reference number 140, the MEC middleware platform may map the ESID and/or the host identifier for authentication. For example, the MEC middleware platform may serve as an authentication platform that authenticates user devices that request with the MEC environment to access and/or communicate with the new tenant application. In such cases, the MEC middleware platform may manage (e.g., store and/or maintain) the ESID and the host identifier for the new tenant application in a mapping. Accordingly, when a communication that identifies the ESID and/or the host identifier is received from a user device, the user device can be authenticated (e.g., verified as being associated with the new tenant application and/or MEC environment) and authorized to access and/or communicate with the new tenant application.

Additionally, or alternatively, the MEC middleware platform may send the ESID and/or host identifier to an authentication platform, as shown, to permit the authentication platform to authenticate devices that are to access and/or communicate with the new tenant application. In such cases, the authentication platform may serve as a remote authentication platform of the MEC environment. For example, the authentication platform may interact with a device proxy of the MEC middleware platform, as described below, when devices send messages and/or communications, to the MEC environment, that are associated with the new tenant application. During authentication of a communication from a user device, if a device identifier that identifies the user device is registered to the new tenant application, the MEC middleware platform and/or authentication platform may return the ESID and/or the host identifier for the device identifier and authenticate the communication (and/or user device). In some implementations, the authentication platform can be included as part of the MEC middleware platform and/or may be included within the MEC environment.

In this way, the ESID and the host ID may be mapped for the new tenant application for authentication to permit a user device to be authenticated and/or authorized to access the new tenant application, as described herein.

As further shown in FIG. 1, and by reference number 150, a new user device may request to access the MEC environment. For example, the new user device may send a message to access the MEC environment and/or a tenant application of the MEC environment. In some implementations, the example message may include a host identifier and/or ESID associated with a tenant application of the MEC environment. Additionally, or alternatively, the message may be a message from another device associated with the new user device (e.g., a control device associated with the new user device) that indicates that the new user device is going to be registering with the MEC environment. Referring to the example above, the entity that provides a security service via the IDS may indicate to the authentication platform that a user device has been provisioned to provide the security service via the IDS tenant application. Accordingly, as shown in example implementation 100, the authentication platform may be updated to include a mapping of the device identifier (shown as device ID 3456) for the provisioned user device and indicate that the provisioned user device is associated with (e.g., mapped to) ESID d and host identifier EntityD.

As further shown in FIG. 1, and by reference number 160, user devices can be associated with the tenant applications via a mapping of device identifiers associated with the user devices to the ESID and/or the host identifier. Accordingly, a message from a new user device, that indicates an ESID and/or a host identifier associated with a tenant application, may indicate that the new user device is associated with the new application and/or is to be able to access the new tenant application. In some implementations, the authentication platform may be preconfigured with one or more of the device identifiers. Accordingly, the MEC middleware platform may authenticate the new user device based on the ESID and/or the host identifier.

In this way, the MEC middleware platform may automatically onboard a new tenant application and/or associate a new user device to one or more tenant applications hosted by the MEC environment. Using a unique ESID and/or host identifier for a tenant application, the MEC middleware platform can make the tenant application available to any user device that is capable of communicating with the MEC environment. Furthermore, any external platform that is available to communicate with the MEC environment via the one or more tenant applications can receive information associated with the tenant applications. Therefore, the MEC middleware platform enables a simple, uniform process for receiving and onboarding new tenant applications in a MEC environment to permit new user devices and/or external platforms to access the new tenant applications without a complex series of communications between a plurality of platforms.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of example implementation 100 may perform one or more functions described as being performed by another set of devices of example implementation 100.

Figure 2:
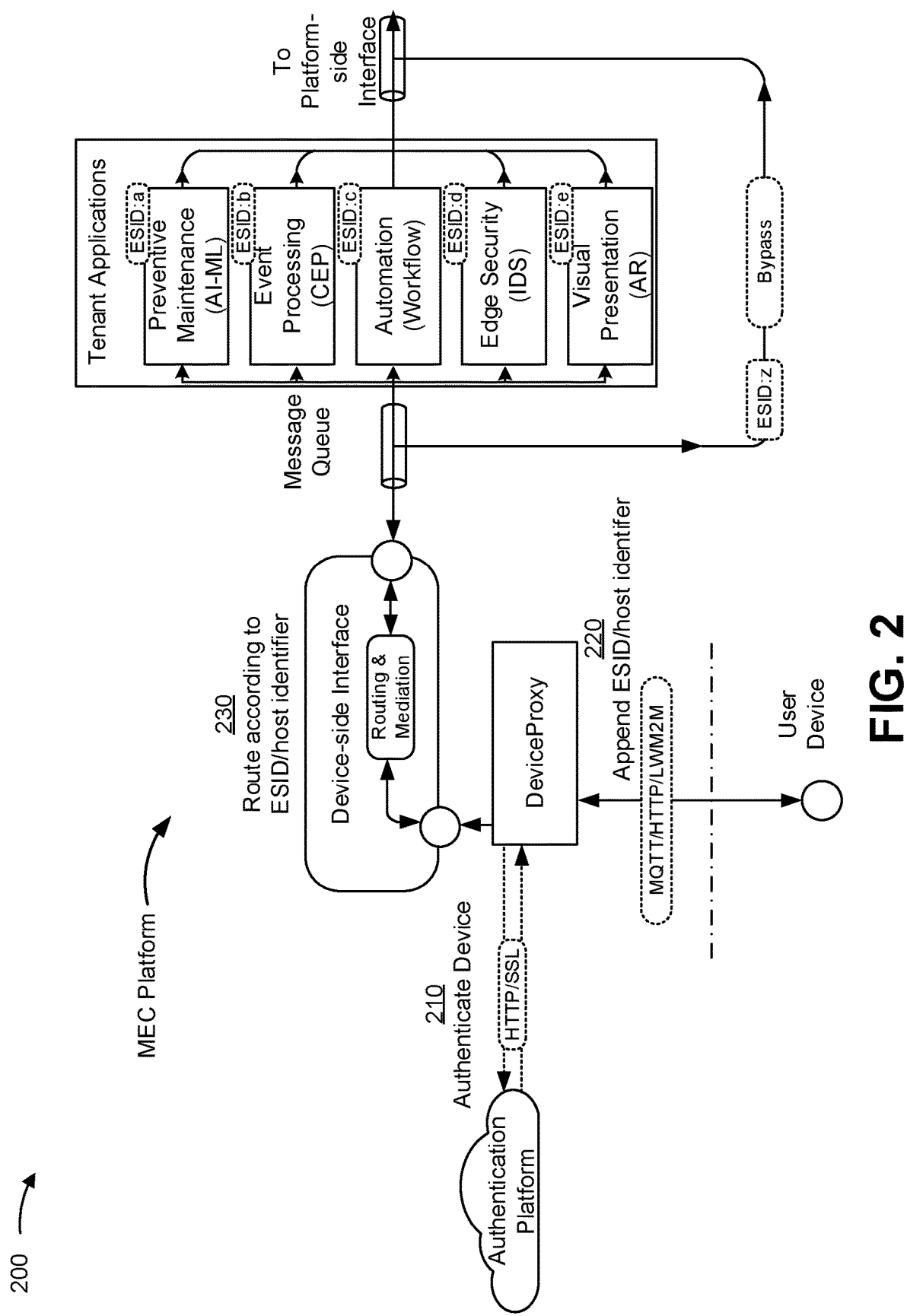

FIG. 2 is a diagram of an example implementation 200 described herein. Example implementation 200 of FIG. 2 illustrates example routing of communications from a user device on a device-side of the MEC middleware platform. As shown, the MEC middleware platform may include a device-side interface component that is communicatively coupled with a device proxy. As described herein, the device-side interface can provide routing and/or mediation for communications between tenant applications of the MEC middleware platform and user devices and/or between the user devices and a platform-side of the MEC middleware platform.

As described herein, tenant applications may be instances of edge computing logics that consume data from the user devices. For example, as shown by ESIDs a-e in example implementation 200, the tenant applications may include one or more of a preventative maintenance application (e.g., implemented via a trained artificial intelligence and/or machine learning model), an event processing application (e.g., using a complex event processing (CEP) model), an automation model (e.g., using a digital workflow), an edge security application (e.g., IDS), and/or a visual presentation application (e.g., augmented reality). Additionally, or alternatively, the one or more tenant applications can provide an edge event analytics application, an edge visual processing application, third-party edge computing solutions, and so on.

Figure 3:
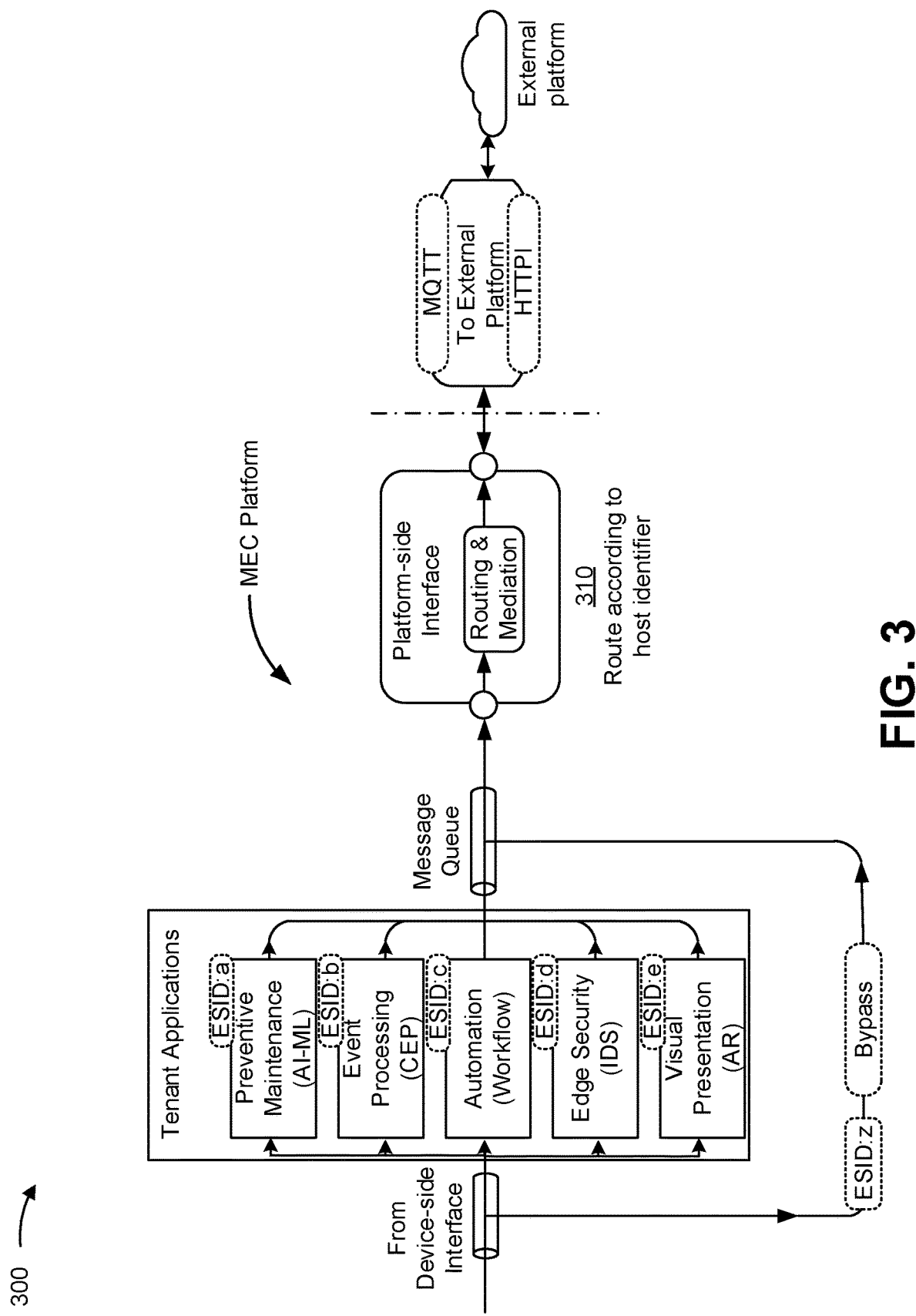

As described herein, the MEC middleware platform provides routing and/or mediation on a device-side of the MEC environment (shown in FIG. 2) and a platform-side of the MEC environment (shown in FIG. 3). Accordingly, the MEC middleware platform, to perform routing and/or mediation of messages and/or communications of a communication session, can include one or more data messaging systems, network interfaces, databases, storages, and/or the like.

The MEC middleware platform may include one or more interface components for receiving different types of communications and/or messages (e.g., messages formatted using different communication protocols) and/or transmitting different types of messages. For example, via the device-side interface of example implementation 200, when a communication has a message queueing telemetry transport (MQTT) protocol, an MQTT component of the device-side interface may be used as a receiving or input component. Accordingly, the MEC middleware platform may support and/or include any suitable communication protocol components to enable protocol conversion and/or receipt of a variety of types of communications. For example, the MEC middleware platform may include one or more of an MQTT component, a hypertext transfer protocol (HTTP) component, an AMQP, KAFKA, an efficient large-group key (ELK), NodeJS, and/or the like.

As described herein, the MEC middleware platform performs routing and/or mediation of messages or communications between user devices, tenant applications of the MEC environment, and external platforms. For example, mediation may involve orchestrating or configuring a communication session between interface components of the MEC environment and performing one or more operations associated with messages of the message flow (e.g., protocol conversion, data format transformation, service policy enforcement, filtered service pipelining, and/or the like). In other words, the MEC middleware platform may perform one or more mediation processes on a communication to transfer the message from one or more endpoint components (e.g., one or more user devices, one or more tenant applications, one or more external platforms, and/or the like), to forward the communication on to one or more other endpoint components. In some implementations, the MEC middleware platform may use a model and/or mapping to perform mediation according to one or more Enterprise Integration Patterns (EIP) identified in message flows of the MEC environment.

As described herein, the MEC middleware platform may configure one or more routes for a communication session involving a tenant application. The MEC middleware platform may utilize any suitable means to perform routing and/or mediation for a communication session involving a tenant application. For example, to define routing of communications of the communication session, the MEC middleware platform may utilize one or more domain specific languages, such as one or more application programming interfaces (APIs), one or more extensive markup language (XML) configuration files, one or more object-oriented languages, and/or the like. In this way, the MEC middleware platform may route communications of the communication session in any suitable manner.

As shown in FIG. 2, a device-side of the MEC middleware platform includes a device proxy and a device-side interface. In example implementation 200, the device proxy may receive one or more communications or messages (e.g., registration messages, request to access a tenant application, and/or the like) from a user device. The device proxy may be configured to communicate with the user device according to a plurality of communication protocols (e.g., MQTT, HTTP, lightweight machine to machine (LWM2M), and/or the like). In some implementations, the device proxy communicates with the authentication platform and/or the device-side interface via a secure tunnel (e.g., a secure socket layer (SSL) tunnel, a transport layer security (TLS) tunnel, a datagram transport layer security tunnel (DTSL), and/or the like).

As shown by reference number 210, the device proxy may authenticate the one or more messages via an authentication platform (which may be separate from, partially included as part of the MEC middleware platform, and/or entirely included as part of the MEC middleware platform). In some implementations, the device proxy may perform a conversion protocol associated with the message. For example, if the received message is associated with MQTT, and the authentication platform is configured to receive HTTP, the device proxy may convert the message from MQTT to HTTP using an MQTT component to receive the message from the device, a conversion process, and an HTTP component to forward the message for authentication.

As described herein, the device proxy may authenticate a message or communication to verify that the user device is authorized to communicate with and/or is associated with a tenant application of the MEC middleware platform. To authenticate the user device, the device proxy may send an authentication query message to the authentication platform. The authentication query message may include a device identifier (e.g., an international mobile equipment identity (IMEI), a serial number, a media access control (MAC) address, and/or the like). In some implementations, if the authentication platform is separate from the MEC middleware platform (e.g., remotely located from the MEC middleware platform), the authentication query message may include a MEC middleware platform identifier that identifies the MEC and/or a platform device that is hosting the MEC environment.

In some implementations, the device proxy may authenticate the message to determine which tenant application is to receive the message. For example, the message may include input data for the tenant application. In such cases, the device proxy may authenticate the message via the authentication platform and receive the ESID and/or host identifier from the authentication platform (e.g., which may be included in a mapping of the new tenant applications to device identifiers, as described herein). In this way, the device proxy may determine an ESID and/or host identifier associated with the message from the user device.

As further shown in FIG. 2, and by reference number 220, the device proxy may append the ESID and/or the host identifier to a header of the message. For example, the device proxy may include the ESID and/or the host identifier to permit the MEC middleware platform (e.g., the device-side interface) to perform routing and/or mediation of the message according to the ESID and/or host identifier. In this way, the device proxy may provide the message with the ESID and/or the host identifier to the device-side interface to permit the device-side interface to perform routing and/or mediation of the message.

In some implementations, the device-side interface may be configured to forward and/or route messages from the tenant applications to the user device. For example, the tenant applications may send command messages to the user device to cause the user device to provide information associated with a service provided by the application. Referring to the example above, the IDS application may be configured to cause a sensor of the IDS to provide an operability status or perform a liveness test associated with the sensor. The device-side interface may cause the device proxy to send such messages to the user devices using the communication protocol of the user device.

As further shown in FIG. 2, and by reference number 230, the device-side interface performs routing and/or mediation according to the ESID and/or host identifier. For example, if a message header includes ESID d, the device-side interface may forward the message to the IDS tenant application. In some implementations, such a message may include input data for the IDS tenant application. In such cases, once received, the input data may cause the tenant application to process the input data and generate output data from the application. Such output data may be forwarded to an external platform associated with the tenant application (e.g., based on the host identifier being included in the header) and/or sent back, via the device-side interface and device proxy, to the user device.

Additionally, or alternatively, if the message header includes a host identifier EntityD, the device-side interface may forward and/or multicast the message to an external platform associated with the IDS tenant application. In some implementations, a message may be provided from the user device to the external platform without the message being received and/or processed by the tenant application. For example, based on a type of message (e.g., a status message for the external platform) and/or the header including only the host identifier (e.g., because the user device was not yet mapped to a tenant application), the message may be forwarded through a bypass route that passes through the MEC environment. In some implementations, the bypass route may be mapped and/or correspond to a default ESID (shown as ESID z).

In this way, the device-side interface of the MEC middleware platform may communicate with the user device and/or perform routing and/or mediation of messages of a communication session associated with the user device to permit the tenant applications to process data associated with communication sessions and/or to permit external platforms to receive information associated with the user devices and/or the tenant applications.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example implementation 200 may perform one or more functions described as being performed by another set of devices of example implementation 200.

FIG. 3 is a diagram of an example implementation 300 described herein. Example implementation 300 of FIG. 3 illustrates example routing of communications from the tenant applications and/or the device-side interface. As shown, the MEC middleware platform may include a platform-side interface component that is communicatively coupled with an external platform and/or one or more components associated with the external platform. As described herein, the platform-side interface can provide routing and/or mediation for communications between the tenant applications of the MEC middleware platform and external platforms and/or between the device-side interface and the external platforms.

As shown in FIG. 3, and by reference number 310, the platform-side interface routes communications to the external platforms according to the host identifier. As described herein, the host identifier may be included in the header of the communications. In some implementations, a communication may include output data from a tenant application processing input data received from the user device of example implementation 200. In such cases, the output data may be provided as report data, log data, notification data, and/or the like associated with the tenant application. In some implementations, the platform-side interface may generate and/or create one or more reports, logs, and/or notifications (e.g., alert messages) based on the output data from the tenant application. As described herein, the platform-side interface may forward raw user device data received through the bypass route from the device-side interface. In this way, the external platform may receive the raw user device data that is processed by the tenant application.

In some implementations, the platform-side interface may perform a protocol conversion of a communication based on the external platform that is to receive the communication. For example, when a message is to be sent to an external web server, an HTTP component of the MEC middleware platform may be used, by the platform-side interface, as an outbound component to transmit the communication. Accordingly, when receiving communications via the bypass, the destination external platform(s) and communication method(s) may be determined based on a mapping of the host identifiers to the external platforms and/or communication protocols. For example, when using HTTP (e.g., for output data from the tenant applications), an API access rule may be configured by the platform-side interface according to the MEC middleware platform. On the other hand, when using MQTT, a bridge between the external platform and the MEC environment may be configured (e.g., by the MEC middleware platform and/or the external platform) using one or more parameters (e.g., bridge address/port, bridge client identifier (e.g., MEC middleware platform identifier), one or more credentials, one or more certificates, and/or the like).

In this way, the platform-side interface may facilitate communication between the MEC environment and external platforms associated with tenant applications hosted in the MEC environment. Although an example implementation is described in connection with the platform-side interface providing communications to the external platforms, the platform-side interface may perform routing and/or mediation from the external platform to the tenant applications and/or the device-side interface in a similar manner (e.g., including an ESID of a tenant application, default ESID for a bypass, device identifier of a user device, and/or the like in a header of the communication).

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example implementation 300 may perform one or more functions described as being performed by another set of devices of example implementation 300.

Figure 4:
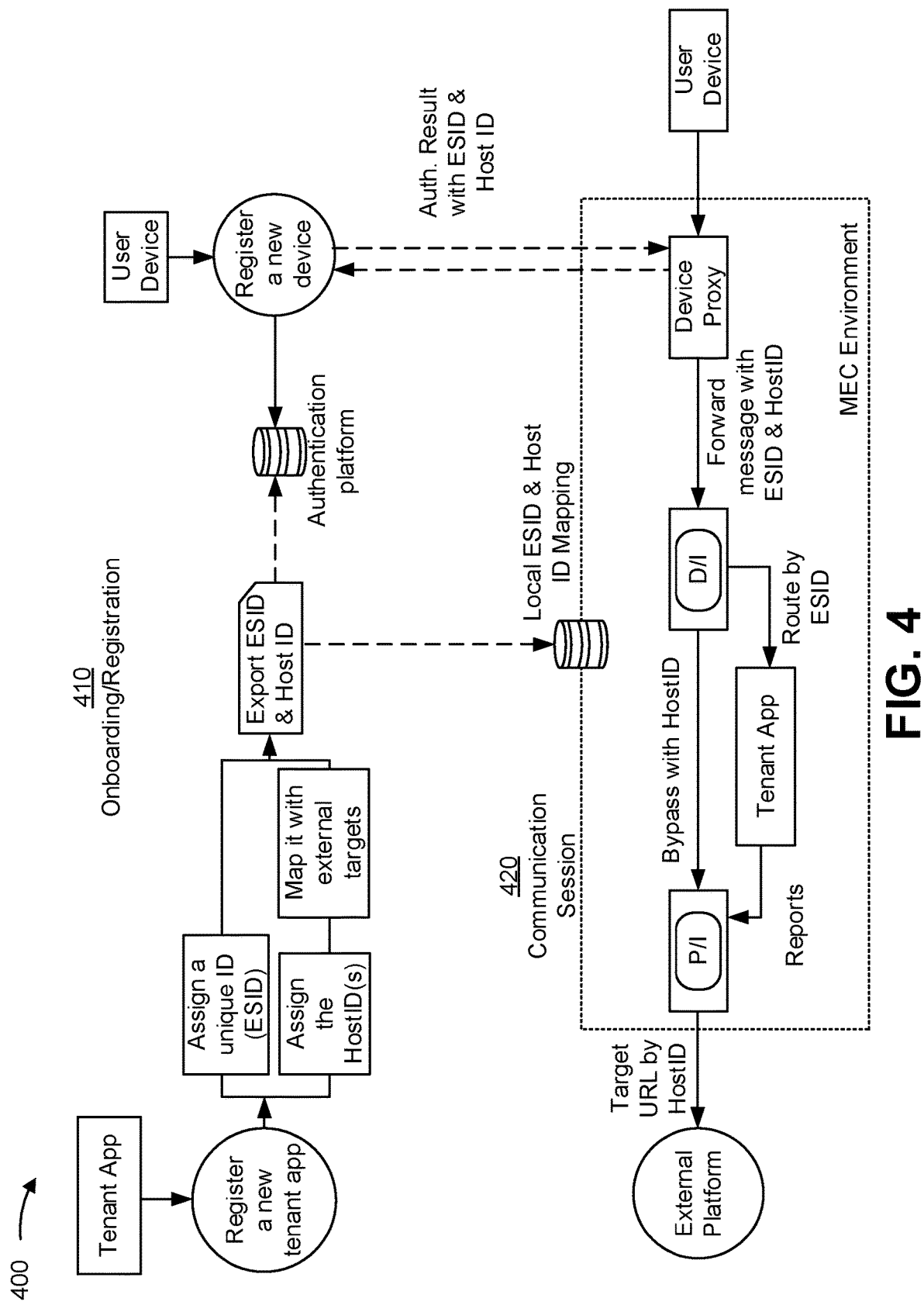

FIG. 4 is a diagram of an example implementation 400 described herein. Example implementation 400 of FIG. 4 illustrates an example use of a mapping of ESIDs and/or host identifiers for a communication session between a user device, tenant application, and an external platform.

As shown in FIG. 4, and by reference number 410, an onboarding and/or registration process is performed to onboard a tenant application and/or register a user device with the MEC environment. The MEC middleware platform of the MEC environment may perform the onboarding and/or registration process as described above. As shown in example implementation 400, the MEC middleware platform of the MEC environment has a local mapping of the ESID and/or the host identifier (e.g., that matches and/or corresponds to a mapping of the authentication platform). Accordingly, the local mapping may be used to authenticate a user device and/or route a message.

As further shown in FIG. 4, and by reference number 420, the MEC middleware platform may configure a communication session through the MEC environment. For example, the MEC middleware platform may route communications of the communication session through the MEC environment according to the ESID and/or host identifier as described herein. The MEC middleware platform may utilize the local ESID and host identifier mapping. In some implementations, if the local mapping does not include a device identifier of a user device (e.g., a user device involved in the communication session), the MEC middleware platform may use the authentication platform to authenticate the user device, as described herein.

As shown, the communication session may include the MEC middleware platform (which includes the device proxy, the device-side interface (shown as D/I), and the platform-side interface (shown as P/I). As described herein, during the communication session, the MEC middleware platform may forward messages from the device proxy to the device-side interface based on the ESID and/or the host identifier. Further, the device-side interface may route the communications to the tenant application (e.g., based on the ESID). The tenant application may be executed (e.g., according to the MEC middleware platform and/or MEC environment) to generate output data. Additionally, or alternatively, the device-side interface may bypass communications around the tenant application (e.g., based on an empty ESID field, a default ESID, and/or the like), directly to the platform-side interface.

In this way, a communication session can be configured to permit a MEC middleware platform to route communications associated with tenant applications through a MEC environment using an ESID and/or host identifier assigned during onboarding of the tenant applications.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example implementation 400 may perform one or more functions described as being performed by another set of devices of example implementation 400.

In this way, a MEC middleware platform may be configured to onboard one or more tenant applications for a MEC environment using one or more uniform processes. As described herein, such processes may involve assigning an ESID and/or host identifier and mapping the ESID and/or host identifier for authentication of communications and/or user devices in communication with the tenant applications. Therefore, the MEC middleware platform, relative to previous techniques, reduces complexity of onboarding applications and conserves processing resources and/or network resources that may otherwise be used in multiple, redundant communications between multiple platforms used in the previous techniques.

Figure 5A:
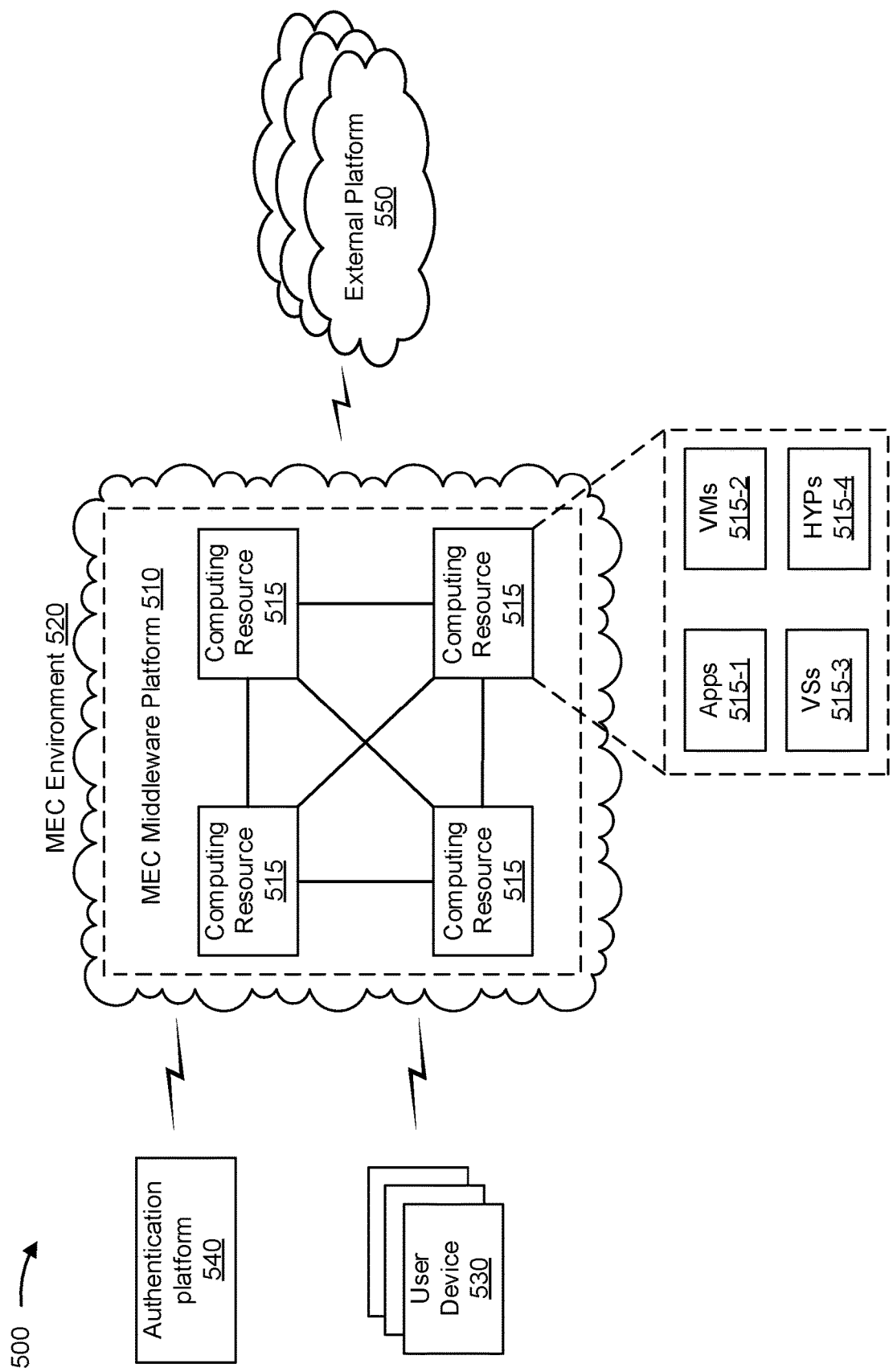
FIGS. 5A and 5B are diagrams of an example environment in which systems and/or methods described herein may be implemented.
Figure 5B:
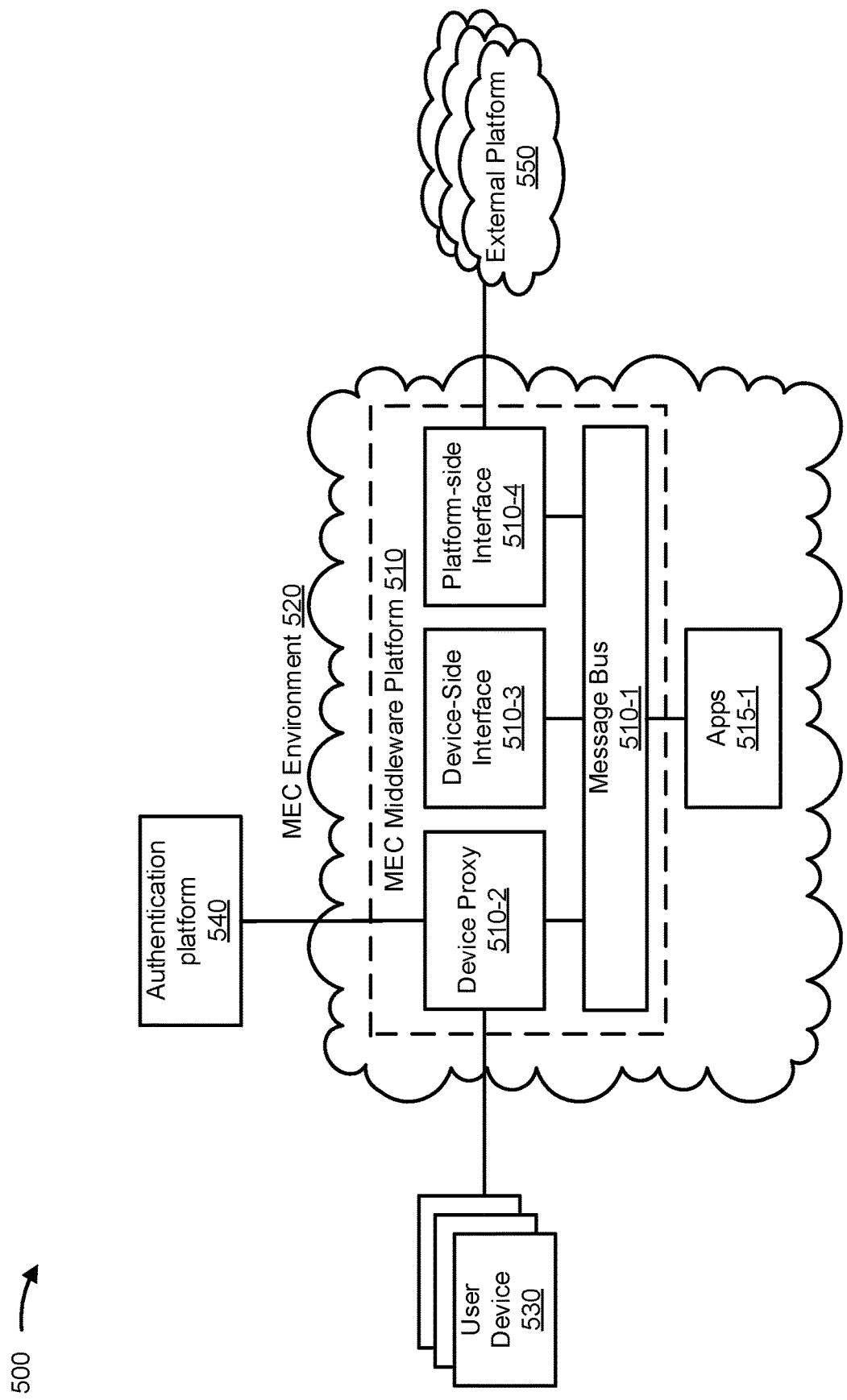

FIGS. 5A and 5B are diagrams of an example environment 500 in which systems and/or methods described herein may be implemented. As shown in FIGS. 5A and 5B, environment 500 may include a MEC middleware platform 510 implemented by one or more computing resources 515 (referred to individually as "computing resource 515" and collectively as "computing resources 515"), a MEC environment 520, one or more user devices 530 (referred to individually as "user device 530" and collectively as "user devices 530"), an authentication platform 540, and one or more external platforms 550 (referred to individually as "external platform 550" and collectively as "external platforms 550"). Devices of environment 500 may interconnect via wired connections, wireless connections, or a combination of wired and wireless connections.

As shown in FIG. 5A, MEC middleware platform 510 includes one or more computing resources 515 assigned to receive, onboard, execute, process, and/or provide one or more services associated with tenant applications, as described herein. For example, MEC middleware platform 510 may be a platform implemented by MEC environment 520 that may receive new tenant applications, onboard the tenant applications by assigning ESIDs, host identifiers, and/or the like to the tenant applications, and execute the tenant applications according to information and/or communications received from user devices 530 and/or external platforms 550. In some implementations, MEC middleware platform 510 is implemented by computing resources 515 of MEC environment 520.

MEC middleware platform 510 may include a server device or a group of server devices. In some implementations, MEC middleware platform 510 may be hosted in MEC environment 520. Notably, while implementations described herein describe MEC middleware platform 510 as being cloud-based and/or hosted in MEC environment 520, in some implementations, MEC middleware platform 510 may be non-cloud-based or may be partially cloud-based.

MEC environment 520 includes an environment that delivers computing as a service, whereby shared resources, services, etc. may be provided to user devices 530 and/or external platforms 550. MEC environment 520 may provide computation, software, data access, storage, and/or other services that do not require end-user knowledge of a physical location and configuration of a system and/or a device that delivers the services. As shown, MEC environment 520 may include MEC middleware platform 510 and computing resources 515.

Computing resource 515 includes one or more personal computers, workstation computers, server devices, or another type of computation and/or communication device. In some implementations, computing resource 515 may host MEC middleware platform 510. The cloud resources may include compute instances executing in computing resource 515, storage devices provided in computing resource 515, data transfer devices provided by computing resource 515, etc. In some implementations, computing resource 515 may communicate with other computing resources 515 via wired connections, wireless connections, or a combination of wired and wireless connections.

As further shown in FIG. 5A, computing resource 515 may include a group of cloud resources, such as one or more tenant applications ("APPs") 515-1, one or more virtual machines ("VMs") 515-2, virtualized storage ("VSs") 515-3, one or more hypervisors ("HYPs") 515-4, or the like.

Tenant application 515-1 includes one or more software applications that may be provided to or accessed by user devices 530 and/or external platforms 550. Tenant application 515-1 may eliminate a need to install and execute the software applications on user devices 530 and/or external platforms 550. For example, tenant application 515-1 may include software associated with MEC middleware platform 510 and/or any other software capable of being provided via MEC environment 520. In some implementations, one tenant application 515-1 may send/receive information to/from one or more other tenant applications 515-1, via virtual machine 515-2.

Virtual machine 515-2 includes a software implementation of a machine (e.g., a computer) that executes programs like a physical machine. Virtual machine 515-2 may be either a system virtual machine or a process virtual machine, depending upon use and degree of correspondence to any real machine by virtual machine 515-2. A system virtual machine may provide a complete system platform that supports execution of a complete operating system. A process virtual machine may execute a single program and may support a single process. In some implementations, virtual machine 515-2 may execute on behalf of a user (e.g., user device 530), and may manage infrastructure of MEC environment 520, such as data management, synchronization, or long-duration data transfers.

Virtualized storage 515-3 includes one or more storage systems and/or one or more devices that use virtualization techniques within the storage systems or devices of computing resource 515. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 515-4 provides hardware virtualization techniques that allow multiple operating systems (e.g., "guest operating systems") to execute concurrently on a host computer, such as computing resource 515. Hypervisor 515-4 may present a virtual operating platform to the guest operating systems and may manage the execution of the guest operating systems. Multiple instances of a variety of operating systems may share virtualized hardware resources.

User device 530 includes one or more devices capable of receiving, generating, storing, processing, and/or providing information associated with tenant applications of MEC middleware platform 510. For example, user device 530 may include a communication and/or computing device, such as an IoT device, mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Authentication platform 540 includes one or more devices (e.g., one or more server devices) configured to authenticate user devices 530 and/or communications with user devices in association with tenant applications of MEC middleware platform 510. As described herein, authentication platform may be configured to maintain a mapping of user devices 530 to onboarding information assigned to tenant applications of MEC middleware platform 510. For example, as described herein, the authentication platform 540 may map identifiers of the user devices to ESIDs and/or host identifiers of the tenant applications of MEC middleware platform 510. In some implementations, authentication platform 540 may be a part of MEC middleware platform 510 and/or hosted by MEC environment 520.

External platform 550 includes one or more devices (e.g., one or more server devices, a data center, and/or the like) and/or networks (e.g., a data network, a cloud network, and/or the like) that may be configured to communicate with user device 530 and/or one or more applications of MEC middleware platform 510. For example, external platform 550 may be a data center (e.g., associated with an entity, such as an organization that offers one or more services via tenant applications of MEC middleware platform 510) that monitors and/or maintains information associated with applications of MEC middleware platform 510 and/or monitors and/or maintains information associated with user devices 530. External platform 550 may correspond to the example external platform(s) of example implementation 300 and example implementation 400.

As shown in FIG. 5B, MEC environment 520 (which may correspond to MEC environment 520 of FIG. 5A) includes MEC middleware platform 510 (which may correspond to MEC middleware platform 510 of FIG. 5A) and tenant applications 515-1 (which may correspond to tenant applications 515-1 of FIG. 5A). As further shown in FIG. 5B, MEC middleware platform 510 includes a message bus 510-1, a device proxy 510-2, a device-side interface 510-3, and a platform-side interface 510-4. Message bus 510-1 may be any bus that permits communication between components (e.g., computing resources 515) of MEC middleware platform 510. In some implementations, device proxy 510-2, device-side interface 510-3, and/or platform-side interface 510-3 are implemented via one or more computing resources 515.

Device proxy 510-2 includes one or more devices (e.g., computing resources 515) configured to authenticate one or more messages and/or perform routing of one or more messages as described herein. For example, device proxy 510-2 may receive messages from user device 530, authenticate the messages and/or user device 530 via authentication platform 540, append an ESID and/or host identifier to the messages (e.g., in a header of the messages) and forward the messages to device-side interface 510-3. Additionally, or alternatively, device proxy 510-2 may forward messages from tenant applications 515-1 to user devices 530 (e.g., using device identifiers included in the messages and/or obtained from authentication platform 540). Device proxy 510-2 may correspond to the device proxy described above in connection with the example implementations of FIGS. 1-4.

Device-side interface 510-3 includes one or more devices (e.g., computing resources 515) configured to route messages between tenant applications 515-1 and user devices 530 and/or between external platforms 550 and user devices 530. For example, device-side interface 510-3 may route the messages according to the ESID to the tenant applications and/or external platforms 550. Additionally, or alternatively, the device-side interface 510-3 may forward messages to device proxy 510-2, which routes the messages to the user devices 530. Device-side interface 510-3 may correspond to the device-side interface described above in connection with the example implementations of FIGS. 1-4.

Platform-side interface 510-4 includes one or more devices (e.g., computing resources 515) configured to route messages between tenant applications 515-1 and external platforms 550 and/or between device-side interface 510-3 and external platforms 550. For example, platform-side interface may route the messages to external platforms 550 according to a host identifier of the external platforms 550, and/or to the tenant applications 515-1 or device-side interface 510-3 according to the ESID. Platform-side interface 510-4 may correspond to the platform-side interface described above in connection with the example implementations of FIGS. 1-4.

The number and arrangement of devices and networks shown in FIGS. 5A and 5B are provided as one or more examples. In practice, there may be additional devices and/or networks, fewer devices and/or networks, different devices and/or networks, or differently arranged devices and/or networks than those shown in FIGS. 5A and 5B. Furthermore, two or more devices shown in FIGS. 5A and 5B may be implemented within a single device, or a single device shown in FIGS. 5A and 5B may be implemented as multiple, distributed devices. Additionally, or alternatively, a set of devices (e.g., one or more devices) of environment 500 may perform one or more functions described as being performed by another set of devices of environment 500.

FIG. 6 is a diagram of example components of a device 600. Device 600 may correspond to MEC middleware platform 510, computing resource 515, and/or user device 530. In some implementations MEC middleware platform 510, computing resource 515, user device 530, authentication platform 540, and/or one or more devices of external platform 550 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a wireless local area network interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
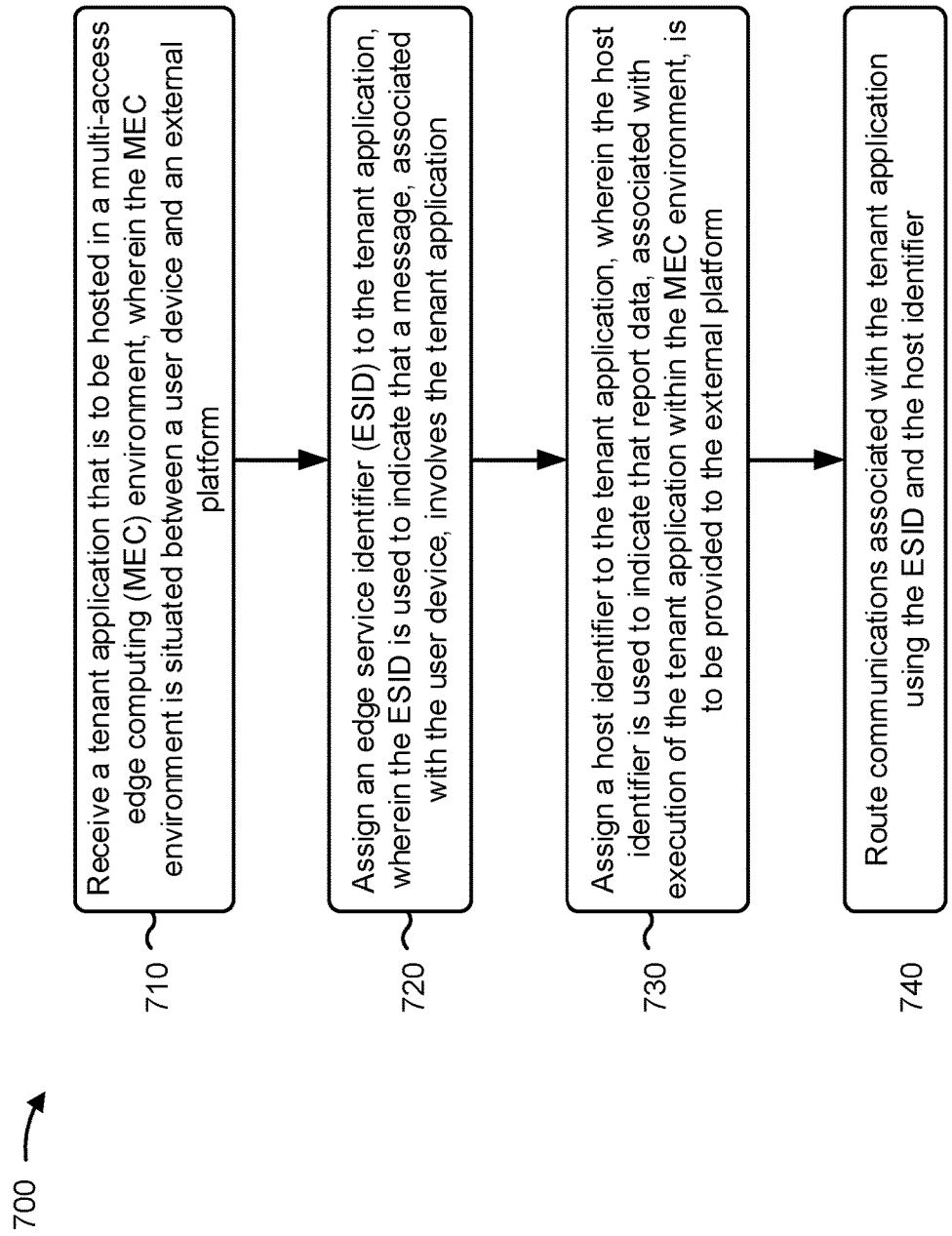
FIG. 7 is a flow chart of an example process for managing applications of a MEC environment.

FIG. 7 is a flow chart of an example process 700 for managing applications of a MEC environment. In some implementations, one or more process blocks of FIG. 7 may be performed by a MEC middleware platform (e.g., MEC middleware platform 510). In some implementations, one or more process blocks of FIG. 7 may be performed by another device or a group of devices separate from or including the MEC middleware platform, such as a computing resource (e.g., computing resource 515), a user device (e.g., user device 530), an authentication platform (e.g., authentication platform 540), an external platform (e.g., external platform 550), and/or the like.

As shown in FIG. 7, process 700 may include receiving a tenant application that is to be hosted in a MEC environment, wherein the MEC environment is situated between a user device and an external platform (block 710). For example, the MEC middleware platform (e.g., using a processor 620, a memory 630, a storage component 640, an input component 650, and a communication interface 670, and/or the like) may receive a tenant application that is to be hosted in a MEC environment, as described above. In some implementations, the MEC environment is situated between a user device and an external platform.

According to some implementations, the MEC middleware platform may receive the tenant application. The MEC middleware platform may onboard and/or install the tenant application within the MEC environment to cause the MEC environment to host the tenant application and permit the user device and/or the external platform to access the tenant application.

As further shown in FIG. 7, process 700 may include assigning an ESID to the tenant application, wherein the ESID is used to indicate that a message, associated with the user device, involves the tenant application (block 720). For example, the MEC middleware platform (e.g., using a processor 620, a memory 630, a storage component 640, an input component 650, and a communication interface 670, and/or the like) may assign an ESID to the tenant application, as described above.

In some implementations, the MEC environment is configured to use the ESID to verify that the user device is associated with the tenant application. For example, the ESID may be a unique identifier relative to a plurality of ESIDs that identify a corresponding plurality of tenant applications of the MEC environment.

As further shown in FIG. 7, process 700 may include assigning a host identifier to the tenant application, wherein the host identifier is used to indicate that report data, associated with execution of the tenant application within the MEC environment, is to be provided to the external platform (block 730). For example, the MEC middleware platform (e.g., using a processor 620, a memory 630, a storage component 640, an input component 650, and a communication interface 670, and/or the like) may assign a host identifier to the tenant application, as described above.

In some implementations, the MEC environment is configured to use the host identifier to identify that the tenant application is associated with the external platform. The host identifier may be a URL of the external platform.

According to some implementations, a communication session involving the user device and the tenant application is configured using the ESID and the host identifier. For example, during the communication session, the MEC middleware platform may route data from the user device to the tenant application based on the ESID. In some implementations, the communication session is configured based on receiving the message. The ESID and/or the host identifier may be included in a header of communications of the communication session.

Additionally, or alternatively, the MEC environment, during the communication session, may receive data from the user device, cause the tenant application to process the data to generate first application data, and send the first application data to the external platform. In some implementations, the communication session is configured to permit the MEC environment to provide the first application data to the external platform and provide second application data to the user device. The first application data and the second application data are generated based on execution of the tenant application in association with the communication session. For example, the first application data may correspond to report data, and the MEC middleware platform may receive a message from the user device, cause the tenant application to process input data in the message to generate the report data, and send the report data to the external platform.

In some implementations, before configuring the communication session, the MEC middleware platform may authenticate the user device via a device identifier associated with the message. The user device may be authenticated using a mapping that maps the device identifier to the ESID and the host identifier. In some implementations, the MEC middleware platform may register the user device with the tenant application based on at least one of the ESID or the host identifier (e.g., by adding an identifier of the user device to the mapping).

As further shown in FIG. 7, process 700 may include routing communications associated with the tenant application using the ESID and the host identifier (block 740). For example, the MEC middleware platform (e.g., using a processor 620, a memory 630, a storage component 640, an input component 650, and a communication interface 670, and/or the like) may route communications associated with the tenant application using the ESID and the host identifier, as described above.

In some implementations, the MEC middleware platform may process, by executing the tenant application, input data received in a message from the user device. For example, the MEC middleware platform may receive the message from the user device, determine, based on an identifier of the user device and the ESID, that the message is associated with the tenant application, and provide the input data to the tenant application to permit the input data to be processed. Accordingly, the MEC middleware platform may, based on processing the input data, provide output data from the tenant application to at least one of the user device or the external platform. In some implementations, the MEC middleware platform may perform a protocol conversion of the message based on a communication protocol of the user device, a communication protocol of the MEC environment, a communication protocol of the external platform, and/or the like.

Process 700 may include additional implementations, such as any single implementation or any combination of implementations in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   assigning, by a device, an edge service identifier (ESID) to an application, wherein the application is hosted in a multi-access edge computing (MEC) environment;
   assigning, by the device, a host identifier to the application by including the host identifier in a mapping of the application to the ESID;
   receiving, by the device and from a user device, a communication that identifies the ESID or the host identifier;
   authenticating, by the device, the user device via a device identifier associated with the communication,
      wherein authenticating the user device comprises:
         mapping the device identifier to the ESID and the host identifier using the mapping, and
         sending the ESID or the host identifier to an authentication platform included within the MEC environment; and
   configuring, by the device, one or more routes for a communication session involving the user device and the application using the ESID and the host identifier.

2. The method of claim 1, wherein the host identifier is associated with a uniform resource locator associated with an external platform.

3. The method of claim 1, wherein the ESID permits the application to be identified by user devices, including the user device, accessing the application.

4. The method of claim 1, wherein assigning the host identifier comprises:
   determining the host identifier based on one or more characteristics of the application.

5. The method of claim 4, wherein the one or more characteristics include:
   a source identifier of the application,
   a target identifier of the application,
   an application type identifier of the application, or
   a service identifier provided by the application.

6. The method of claim 1, wherein authenticating the user device comprises:
   mapping the device identifier to the ESID and the host identifier,
   verifying the user device as being associated with the application, or
   authorizing the user device to access the application.

7. The method of claim 1, wherein the host identifier is associated with an entity that controls an intrusion detection system associated with the application.

8. A non-transitory computer-readable medium storing a set of instructions, the set of instructions comprising:
   one or more instructions that, when executed by one or more processors of a device, cause the device to:
      assign an edge service identifier (ESID) to an application, wherein the application is hosted in a multi-access edge computing (MEC) environment;
      assign a host identifier to the application by including the host identifier in a mapping of the application to the ESID;
      receive, from a user device, a communication that identifies the ESID or the host identifier;
      authenticate the user device via a device identifier associated with the communication,
         wherein the one or more instructions, to authenticate the user device, cause the device to:
            map the device identifier to the ESID and the host identifier using the mapping, and send the ESID or the host identifier to an authentication platform included within the MEC environment; and configure one or more routes for a communication session involving the user device and the application using the ESID and the host identifier.

9. The non-transitory computer-readable medium of claim 8, wherein the host identifier is associated with a uniform resource locator associated with an external platform.

10. The non-transitory computer-readable medium of claim 8, wherein the ESID permits the application to be identified by user devices, including the user device, accessing the application.

11. The non-transitory computer-readable medium of claim 8, wherein the one or more instructions, that cause the device to assign the host identifier, cause the device to:

determine the host identifier based on one or more characteristics of the application.

12. The non-transitory computer-readable medium of claim 11, wherein the one or more characteristics include:

a source identifier of the application, a target identifier of the application, an application type identifier of the application, or a service identifier provided by the application.

13. The non-transitory computer-readable medium of claim 8, wherein the one or more instructions, that cause the device to authenticate the user device, cause the device to:

map the device identifier to the ESID and the host identifier, verify the user device as being associated with the application, or authorize the user device to access the application.

14. The non-transitory computer-readable medium of claim 8, wherein the one or more instructions, that cause the device to assign the ESID to the application, cause the device to:

assign the ESID to the application with a descriptor of the application.

15. A device, comprising:
one or more processors configured to:

assign an edge service identifier (ESID) to an application, wherein the application is hosted in a multi-access edge computing (MEC) environment;

assign a host identifier to the application by including the host identifier in a mapping of the application to the ESID;

receive, from a user device, a communication that identifies the ESID or the host identifier;

authenticate the user device via a device identifier associated with the communication, wherein the one or more processors, to authenticate the user device, are configured to:

map the device identifier to the ESID and the host identifier using the mapping, and send the ESID or the host identifier to an authentication platform included within the MEC environment; and configure one or more routes for a communication session involving the user device and the application using the ESID and the host identifier.

16. The device of claim 15, wherein the host identifier is associated with a uniform resource locator associated with an external platform.

17. The device of claim 15, wherein the ESID permits the application to be identified by user devices, including the user device, accessing the application.

18. The device of claim 15, wherein the one or more processors, to assign the host identifier, are configured to:

determine the host identifier based on one or more characteristics of the application.

19. The device of claim 18, wherein the one or more characteristics include:

a source identifier of the application, a target identifier of the application, an application type identifier of the application, or a service identifier provided by the application.

20. The device of claim 15, wherein the communication indicates that the user device has been provisioned to provide security service.

* * * * *